Inventors:
Franklin A. Reece
John Reece
by Morrison, Kennedy
& Campbell, ATTORNEYS Patented Feb. 16, 1932

1,845,332

UNITED STATES PATENT OFFICE

FRANKLIN A. REECE, OF BROOKLINE, AND JOHN REECE, OF BOSTON, MASSACHUSETTS, ASSIGNORS TO REECE TRANSMISSION COMPANY, OF BOSTON, MASSACHUSETTS, A CORPORATION OF MAINE

POWER TRANSMISSION

Application filed August 31, 1929. Serial No. 389,694.

This invention relates to power transmission, and involves a novel apparatus for the mechanical transmission of power from a driving shaft or other source of power to a driven shaft or other load in a variable manner.

A typical purpose for which the invention is useful is for the transmission from the engine to the wheels of a motor vehicle wherein the load is variable and the speed ratio and torque should vary to correspond. The present invention may be advantageously employed as supplemental to the self adjusting transmission mechanism disclosed in our prior Patent No. 1,551,692 of September 1, 1925 involving the principles disclosed in Patent No. 1,546,404 of July 21, 1925; but may be otherwise used, for example in connection with the usual motor vehicle clutch, or the unclutching means embodied in the present disclosure.

The general object of the present invention is to afford means of power transmission adapted to meet the requirements referred to with efficiency and smoothness of operation and with convenience of control and compactness and strength of structure. A particular object hereof, especially when employed with the self regulating transmission of certain prior patents, is to afford reduced speed drive conditions with high driving torque and with ease of shift from one driving condition or adjustment to another. A further object is to afford a slow speed drive means of high power which may be applied either for forward or reverse direction of drive.

Other and further objects and advantages of the present invention will be explained in the hereinafter following description of an illustrative embodiment thereof or will be understood to those conversant with the subject. To the attainment of the aforesaid objects and advantages the present invention consists in the novel power transmission apparatus and the novel features of combination, operation, arrangement and structure herein illustrated or described.

In the accompanying drawings.

Figure 1:
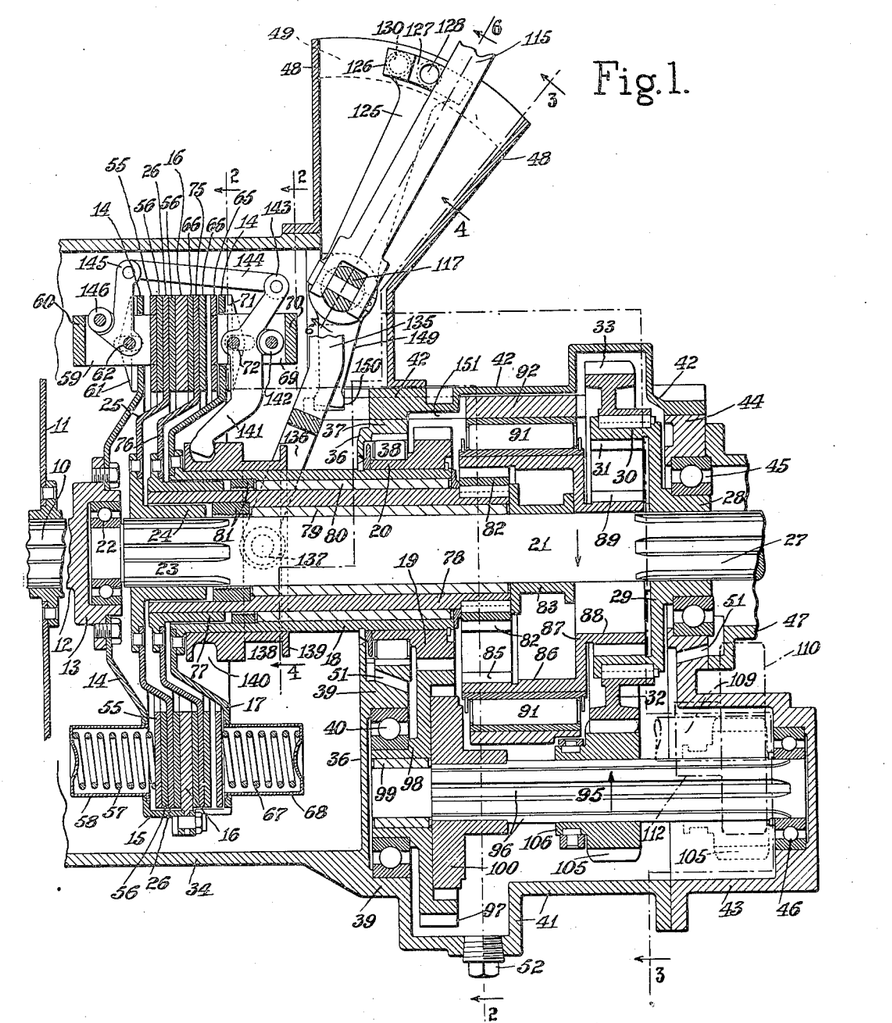
Fig. 1 is a central longitudinal section of a power transmission apparatus embodying the present invention, the parts which are in elevation being viewed from the left side of the vehicle, the upper half of the figure being taken vertically through Fig. 2 between two pairs of coupling springs, while the lower half is taken at a slight angle so as to include one pair of coupling springs.
Figure 2:
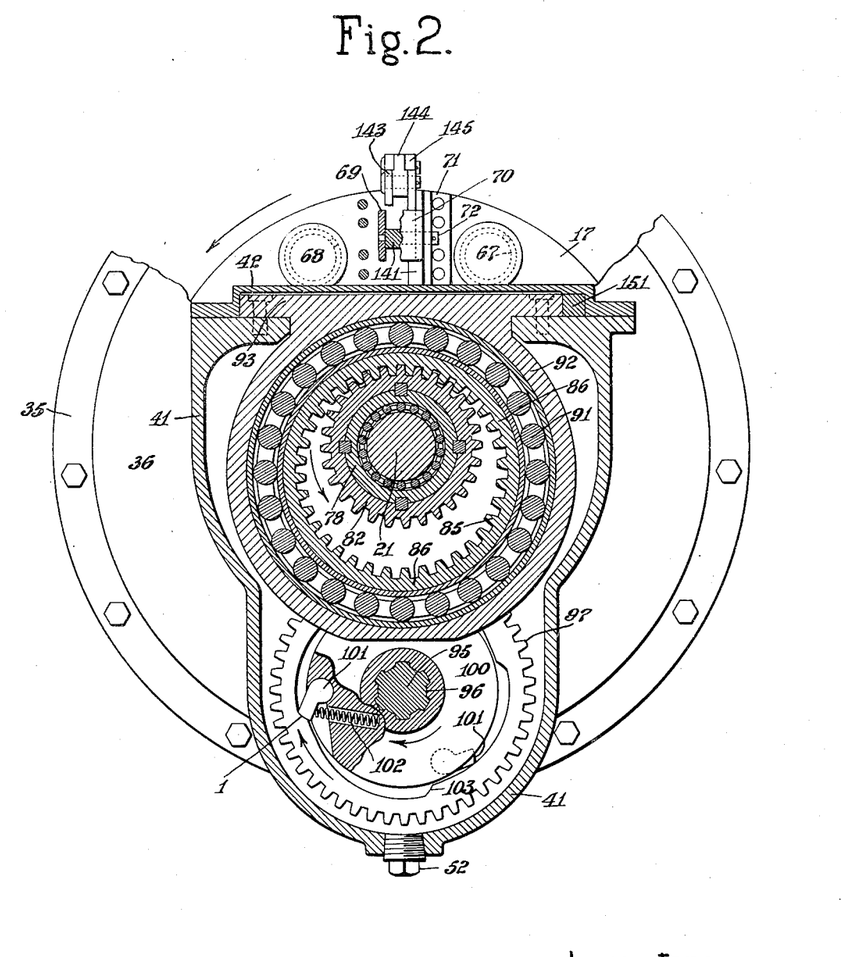
Fig. 2 is a transverse section looking from the rear, that is from the right side of Fig. 1 and taken on different planes as indicated by the section line 2—2 of Fig. 1.
Figure 3:
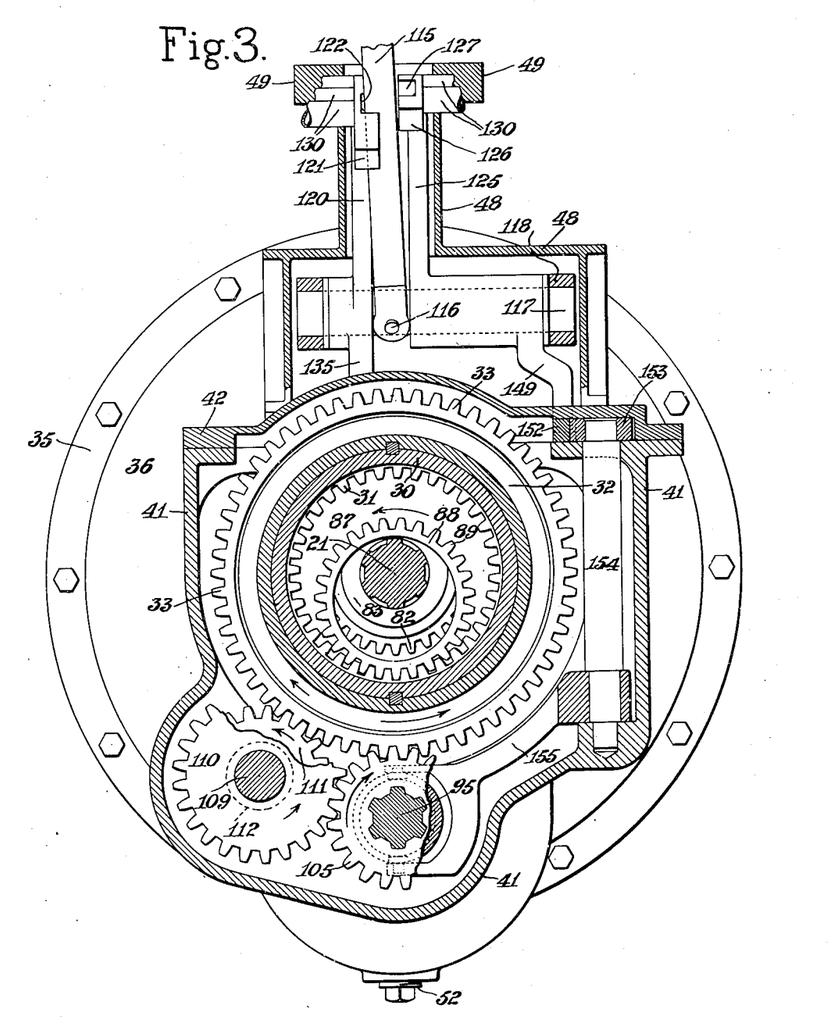
Fig. 3 is a transverse section view similar to Fig. 2, but taken on the planes indicated by the line 3—3 of Fig. 1.
Figure 4:
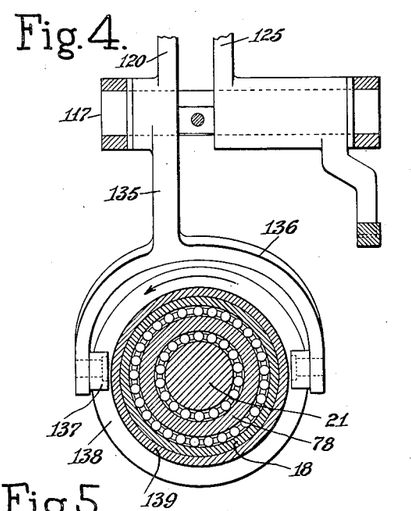
Fig. 4 is a similar section view taken on the planes indicated by the line 4—4 of Fig. 1.

In Fig. 1 the parts are shown set for normal or high speed forward drive, except that in dotted lines an adjustment for reverse drive is indicated, while in Figs. 2, 3 and 4 the indication is the same for any driving adjustment. For convenience the driving or power parts of the apparatus will first be described, then the driven parts, then certain stationary casing parts, then the transmitting mechanisms for the several driving adjustments, and finally the control or lever mechanism for effecting the desired shifts or alterations of drive.

Referring first to the driving parts, there is shown at the extreme front, namely at the left end of Fig. 1, a shaft 10 which may in some cases indicate the engine shaft, but is preferably a separate shaft in alinement with the engine shaft in which case it derives its rotation from the engine shaft through any suitable connection, for example a friction clutch of ordinary construction, conventionally indicated by one of the clutch disks 11. It is contemplated however driving the shaft 10 from the engine shaft through a self regulating transmission means, particularly a centrifugal mass transmission on the principles of said prior Patents Nos. 1,546,404 and 1,551,692, made the subject of claim in copending application 569,430 filed October 17, 1931. The cooperation afforded by each of these respective arrangements will be hereinafter further described.

Fig. 1 indicates what we herein designate as the driving shaft 12, which will preferably be an integral part of the shaft 10 when the latter is only connected with the engine shaft through a clutch, or through other means which permits the equivalent of unclutching operations as is the case with the centrifugal mass transmissions of said prior patents when rotated at low engine speeds. The driving shaft 12 is shown with an enlarged head 13 in the nature of a flange or disk and which may be considered broadly as representing any driving member rotated by and with the driving shaft.

Extending rearwardly from the driving member 13, that is toward the right in Fig. 1, are illustrated the following elements which are preferably in the form of walls constituting a housing for the interior parts. An offset or dished web 14 is shown bolted to the driving member 13, this extending outwardly and being continued as a cylindrical wall 15 surrounding or partly surrounding the coupling disks or members to be described. Attached to rotate with the wall 15 is indicated an inwardly extending flange 16 in the form of an annulus and constituting a coupling disk, flange or annulus cooperating with one or more of the transmitting connections to be described. At the rear end of the wall 15 is shown a second dished web 17. The purpose of dishing these and enclosed webs is to give ample room for the coupling mechanism and yet to crowd forwardly the webs to afford additional central space to accommodate other necessary parts. The inside edge of the web 17 is rigidly attached to a central or concentric sleeve 18 of substantial length. This driving sleeve 18, turning with the driving member 13, carries at its rear end a central gear 19, which therefore is in the nature of a driving gear, turning continuously with the driving member 13. The described parts 12 to 19 turn as a unit.

The driven parts comprise the driven shaft 21 and the parts turning with it. Its front end, at the left of Fig. 1, has a ball bearing 22 between it and the driving member 13. Near its front end the shaft is formed with grooves or keyways at 23 to receive slidingly a toothed sleeve or hub 24 which is extended as a dished web 25, and its peripheral portion or annulus 26 constituting a coupling part or plate cooperating with the driving coupling part or annulus 16 already described, as will be further explained.

Near its rear end the driven shaft 21 is formed with grooves or keyways at 27 to receive a sleeve or hub 28 which is shown as formed with an outwardly extending web 29 turned forwardly into a rim 30. This rim at its inner surface is shown as formed with an internal gear or teeth 31 cooperating in the second or intermediate speed drive to be described. At its outer surface the rim is provided with an extension web 32 carrying a gear or teeth 33, these various parts all being concentric with the axis of the driven shaft, and turning as a unit with it.

The stationary casing or frame parts include the following. Surrounding the described driving parts is shown a fixed cylindrical casing wall 34 which may be extended forwardly to enclose other parts and bolted in place by flange 35 as usual. At the rear end of the wall 35 is a generally circular wall 36 closing off the parts in front thereof in a separate chamber. Integral with the circular wall 36 is shown a rim or flange 37 concentric with the driving parts and containing a bearing or rollers 38 between this rim and the hub 20 of the gear 19 keyed to the driving sleeve 18. The wall 36 also is formed, near its lower side, with a circular flange or rim 39 eccentric to the driving parts and containing a bearing 40 for certain rotating parts to be described. The casing wall is shown extended rearward of the circular wall 36 in the form of a shaped extension 41 arranged to enclose certain parts as seen in Figs. 1, 2 and 3, this extension being formed open at the top but provided with a cover piece 42 closing it. To the flanged rear extremity of the casing extension 41 is shown attached a rearward extension casing 43 which is also shaped to enclose certain parts and forms a rear closure for the casing 41. The extension casing 43 surrounds the driven shaft and is formed with a hub 44, between which and the hub 28, on the driven shaft, is a bearing 45. The extension casing carries also a bearing 46 for rotating parts yet to be described. Attached to the central hub or sleeve 44 of the extension casing is shown a supplemental extension 47 which may be carried rearwardly and arranged to house the rear end of the driven shaft 21, and the universal joint or other rearwardly extending transmitting connections.

Figure 7:
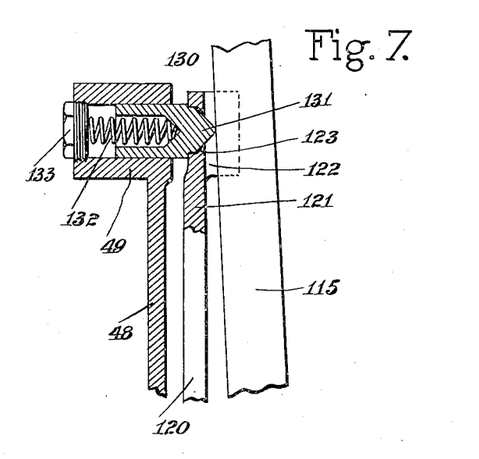
Fig. 7, on a larger scale and in a different section plane shows further details of Fig. 6.
Figure 8:
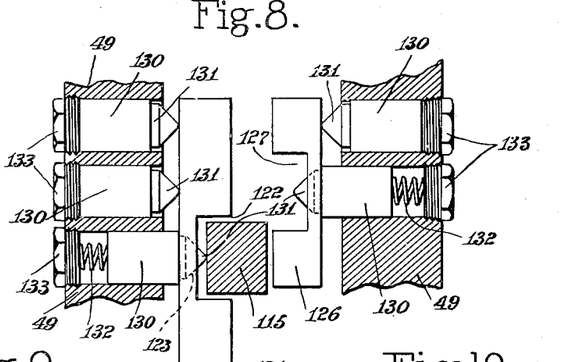
Fig. 8 is a substantially top view and partial section of the parts shown in Figs. 6 and 7.

At the upper rear corner of the cylindrical casing 35 and circular wall 36 these walls are cut away to leave an opening through which the control connections extend, a special casing 48 being shown attached at this point, and extending upwardly to enclose a part of the shifting or controlling lever and its connections, and having exterior side enlargements 49 accommodating certain parts, as shown in Figs. 3, 7 and 8.

The described structure provides for all necessary lubrication, which does not require special description for present purposes, except to point out that various fixed lubrication passages 51 are indicated in Fig. 1, and a drain plug 52. Putting together the structure is allowed for by the design and construction of the parts, which may be attached and assembled in a certain prearranged order.

The transmitting connections will next be described. As herein embodied the present invention provides three forward speeds and a reverse. The high or full speed gives the ratio 1 to 1, the driving and driven parts turning in unison. The intermediate or so-called second speed may afford approximately the ratio 1.7 to 1. The low speed, for powerful traction, may afford the ratio 3.5 to 1, while the reverse may be a slightly greater ratio in the neighborhood of 4 to 1. These respective ratios are of advantage especially with the modern tendency of reducing the speed ratio at the differential or rear wheel axle which has heretofore been considerably above 4 to 1, but in some cases has been reduced below that ratio. The connections for the respective drives will be described in the order just mentioned.

The high speed drive connections comprise the coupling annulus 16 which turns with the driving member 13 and the coupling member 26 turning with the driven shaft. As indicated in Fig. 1 these are adapted to be coupled for full speed drive by means of a shiftable coupling member 55, which like the members 16 and 26 is in the form of an annulus. While the manner of coupling indicated is in the nature of a frictional clutch engagement, it is intended to include any substitute coupling means which is gradual in action so that the driven shaft can be brought smoothly to the specified speed. The ideal coupling for this purpose is frictional and the three coupling members 16, 26 and 55 are arranged to be pressed together for frictional engagement, with preferably a layer, facing or annulus of friction material 56 interposed between each two.

The coupling for high speed drive is preferably effected by a system of strong springs pressing rearwardly against the coupling annulus 55. For example there may be eight such springs 57 spaced around the periphery, each spring being enclosed in a cylindrical barrel 58 secured to the housing, and the eight springs giving an effective coupling pressure against the annulus 55, so that high speed drive is in effect unless the annulus is retracted forwardly by mechanical means. It will be noted that the coupling or friction members, and the coupling springs and the uncoupling devices to be described all partake of the rotation transmitted from the driving parts, contrary to certain known frictional coupling arrangements. The coupling part 16 may be termed the driving disk or annulus, the part 26 the driven disk and the part 55 the pressing disk, it being a driving element between which and disk 16 the driven disk is sandwiched.

For retracting the high speed coupling annulus 58 to disengage the drive, the annulus may be provided with a system of disengaging extensions 59 in the form of hollow lugs or boxes outstanding forwardly from the annulus and projecting through slots in the housing wall 14. Preferably four of these devices are employed spaced between each alternate pair of coupling springs, as indicated in connection with the intermediate drive in Fig. 2. Each disengaging lug 59 is shown as having at its outer end a thrust wall 60 through which it is forced outwardly by control means to be later described. In its movements each lug slides between an opposed pair of angle plates 61 fixed on the rotating wall 14, while each lug, at both sides, is slotted to accommodate a cross pin or stud 62 extending from one angle piece to the other. When the four disengaging lugs or extensions are thrust outwardly or forwardly, against the engaging pressure of the springs 57, the coupling annulus 55 will be retracted and the annulus 26 thus frictionally uncoupled, terminating the full speed engagement between the driving and driven shafts.

For intermediate speed coupling and uncoupling the described elements 55 and 62 are substantially symmetrically duplicated at the opposite or rear side of the central or driving annulus 16. Thus a coupling annulus or plate 65 is indicated, with friction layers 66 between this annulus and the driven annulus 75 to be described. A system of eight coupling springs enclosed in barrels 68 tend to apply the coupling pressure, while the uncoupling is effected by four hollow lugs 69 each having a thrust wall 70 and sliding between angle plates 71 on the rotary driving wall 17, with cross pins 72 extending from one angle plate to the other through slots in the lugs. The control means or lever connections for adjusting the two frictional coupling systems will be subsequently described.

The driven annulus or disk 75 which is in frictional relation to the driving annulus 16 and the pressure annulus 65 is shown as constituting the periphery of a dished web 76 extending inwardly and formed or attached to a hub 77. In terming the several annuli friction disks or plate it is intended to include any equivalent coupling arrangement in which the elements give gradual engagement whether of flat, circular or other form. The hub 77 is shown keyed or fixed to a sleeve 78 extending rearwardly to a substantial distance surrounding the driven shaft 21 but within and projecting beyond the driving sleeve 18 and gear 19. A system of bearing rollers 79 is indicated between the driven shaft and the sleeve 78, and a similar series of rollers between the sleeve 78 and the driving sleeve 18, and at the forward end of each system of rollers is indicated a threaded oil guard 81 preventing the creeping of oil forwardly toward the coupling devices. At the rear end of the intermediate sleeve 78 is shown a central gear 82 keyed to the sleeve and taking part in the intermediate speed drive. By these parts the central or intermediate gear 82 partakes of the driving rotation when the coupling 16—75—65 is coupled. A flanged spacing member 83 is assembled directly to the rear of the sleeve 78 and gear 82, spacing them from the parts further to the rear.

The rotation of the intermediate gear 82 is communicated to the driven shaft 21 with an appropriate speed reduction, for example 1.7 to 1, by any compact form of speed reduction gearing, the following being preferred as highly efficient, compact and smooth operating. The central gear 82 is an external gear and is shown engaging an internal gear 85 on a rim 86 which is mounted in a substantially eccentric manner, as shown in Figs. 1 and 2. This external-internal gear combination is highly desirable for the purpose. It requires a complementary external-internal combination to restore the alinement of rotation. For this purpose the rim 86 is shown as having a web 87 formed with a rearwardly extending hub 88 carrying external teeth 89 constituting an external gear, which is arranged to engage the teeth of the internal gear 31 already described, mounted upon the driven shaft 21, as illustrated in Fig. 3. The product of the speed reductions by each respective gear pair gives the total speed reduction of the combination, by which, when the intermediate speed drive is coupled, the driven shaft will rotate at a reduced speed in the proportion of 1.7 to 1. The integral member comprising the elements 85 to 89 may be adequately supported by a roller bearing 91 surrounding the rim 86, the outer race being supported by a solid, rigidly mounted ring or casting 92 having an upward extension through the open top of the shaped casing 41, with flanges 93 overlying the casing and bolted to the casing 41 below cover plate 42, as indicated in Fig. 2

With the described high and intermediate speed connections we prefer to combine a low speed transmitting connection, which may extend for example from central gear 19 on the driving parts to the gear 33 on the driven parts, so as to give a substantial speed reduction and high power, for example in the ratio of 3.5 to 1. Such low speed drive connections should be such as to be rendered ineffective when the higher speeds are put in effect. This may be done by a disconnecting adjustment, for example by shifting a part of the gearing to neutral position, as will be described, but in our preferred form of embodiment the low speed connections comprise a device which can be overrun, for example a one-way device in the nature of a pawl and ratchet, so that the higher speed drives can take the drive away from the low speed drive without any need of shifting or disconnection. By such arrangement the low speed drive is in continuous readiness to take effect unless rendered ineffective by intentional disconnection or by unclutching or its equivalent, as may be necessary for purposes of stoppage of the driven shaft.

The description of the low speed drive connections may begin with the counter shaft 95, parallel to the driven shaft, and accommodated within the shaped casing extension 41 and the extension casing 43, and supported directly or indirectly by the bearings 40 and 46 already described; the shaft 95 being formed with keyways or grooves 96 to permit the shifting of the pinion to be described. For driving the counter shaft at low speed there is shown a gear 97 surrounding the counter shaft and with its teeth engaging the driving gear 19. The hub 98 of the gear 97 turns within the bearing 40 and bearing rollers 99 are shown arranged between the hub and the forward end of the counter shaft 95.

The gear 97, instead of being mounted in permanent engagement on the counter shaft is shown as having a one-way connection therewith as illustrated in Figs. 1 and 2. For this purpose a disk 100 is mounted on the counter shaft, in engagement with the keyways thereof, with a one-way drive device between the rim of the gear and the disk. Thus the disk is shown as having a system of three dogs 101 pressed outwardly by springs 102 for engagement with shoulders or notches 103 formed within the rim of the gear. The arrangement is such that the gear shoulders thrust upon the disk dogs and give positive drive to the counter shaft. By employing four shoulders and three dogs there are twelve points of engagement so that after disengagement the maximum relative rotation will be less than thirty degrees. Whereas the gear can drive the disk and counter shaft, the described arrangement permits the disk and counter shaft to be otherwise carried away from the gear by faster rotation, the dogs in that case clicking around, but with imperceptible effect, upon the shoulders of the gear. Any other form of one-way device may be employed for communicating power from the driving parts to the counter shaft for low speed drive purposes, or as stated, the low drive connections may be shifted or disconnected for purposes of other speeds or of stoppage.

The counter shaft 95 carries a shifting or sliding gear 105 of smaller diameter than the gear 97, and this gear 105 meshes directly, as shown in full lines in Fig. 1, with the large driven shaft gear 33, thus completing the low speed drive connections. The shifting gear 105 has an extended hub 106 formed with a groove 107 engageable by shifting means as will be later described.

With this arrangement low speed drive is always in effect when the gear 105 meshes with gear 33 as shown in Fig. 1 unless indeed one of the higher drive connections causes the gears and counter shaft to overrun the gear 97 and one-way device. When the shifting gear 105 is slid to its rearmost position as shown in dotted lines in Fig. 1, this couples up the reverse drive, as will be described. These two positions are far enough removed to leave a neutral position between them, to which the gear 105 may be shifted for disengaging both low and reverse.

Referring to the reverse drive, this is very readily permitted by the described arrangement, for example as follows. One an axle 109 mounted in the fixed casings 41 and 43, seen in Fig. 3 but not in Fig. 1, is a gear 110 and attached to it by an elongated hub 112ª smaller gear 111, the latter being permanently in engagement with the central gear 33 on the driven shaft. The gear 110 will be understood to be in position to be engaged by the shiftable gear 105 only when the latter is shifted to its rearward or dotted line position seen in Fig. 1. At such times the engagement will be as appears in Fig. 3, and the reversal of rotation caused by the idler gears compels the driven parts to turn reversely, and owing to the fact that gear 111 is smaller than 110 the reverse driven speed will be slower than the forward slow drive, or with a ratio in the neighborhood of 4 to 1. Fig. 1 indicates in dotted lines the position of the gear 110 and its hub 112 extending forwardly.

A single control means, preferably a manual lever or shifter, is shown arranged to effect all of the described speed changing connections. Such a lever 115 is indicated in Figs. 1 and 3, this being pivoted by a pin 116 to a cross shaft 117 mounted in fixed bearings 118 in the casing 48. The lever may thereby be swung right and left by its pivot 116, and in either swung position may be shifted forwardly or rearwardly to change the drive connections.

What may be termed a shift arm 120 is shown at the left of the control lever, this adapted to take three positions for shifting between high, low and intermediate speeds. The arm 120 terminates in a curved head 121 having at its inner side a square notch 122 deep enough to receive a substantial part of the width of the lever 115, and the head having a cylindrical and tapered aperture 123 at the base of the notch, to receive the spring locking pins to be described. At the right side of the lever 115 is a second shift arm 125 shiftable between low and reverse positions, this having an arc-shaped head 126 and a notch 127 which is similar to the notch 122 and provided with a similar cylindrical and tapered aperture 128. While the parts are shown adjusted for high speed drive, it will be seen by Fig. 8 that when the shift arms are both set for low, the notches 122 and 127 fall opposite to each other so that the lever 115 may then be swung across from one notch into the other. In any other position the lever is confined to the selected notch by the unnotched part of the opposite head.

A system of locking pins 130 is mounted in the casing enlargements 49, three at the left side for the shift arm 120 and two at the right side for the shift arm 125. As seen in Figs. 7 and 8 each locking pin has a tip 131 of cylindrical and tapered form such as normally to engage the aperture 123 or 128, with the bluntly pointed extremity extending so far that the lever 115 may be manipulated to push the pointed end and thus force the cylindrical or locking part of the pin out of the hole, the tapered part of the pin then affording a cam action for further yielding of the pin as the lever is shifted to shift the head 121 or 126. Each pin is spring pressed, for example by an interior spring 132, toward locking position, the entire pin being confined in a cylindrical hole in the casing head exteriorly closed by a screw plug 133. Each spring is confined against being forced out of its hole by its spring due to the extended length of the heads of the respective shift arms, until the locking aperture 123 or 128 comes opposite to the pin.

The position of these parts as shown in Figs. 1, 3, 6, 7 and 8 indicates that the operator has thrust the control lever 115 to the left, thus pressing outwardly the middle locking pin, relieving the head 121 of locking engagement, and has then pulled the head and shift arm rearwardly to the high speed position, and then released the lever, permitting the rearmost locking pin to spring into the aperture and so lock the arm in high position, the lever taking a loose position as shown in Figs. 3 and 8 confined by the notch of the head 121 and the unnotched part of the head 126, the latter head being locked in low position by the rearmost locking pin.

The connections from the first shift arm 120 to the coupling devices for the high and intermediate speeds will now be described. The hub of arm 120 turns loosely on the shaft 117 and below the shaft has an extension 135 terminating in a fork 136 carrying opposite studs and rollers 137 engaging in a groove 138 formed circumferentially in a sliding collar or sleeve 139 surrounding the driving sleeve 18. By this arrangement the grooved collar 139 may be shifted axially at will. The collar is shown as formed with a second groove or a series of recesses 140, engaged by the heads of a system of four levers 141 each pivoted on one of the pins 72 already mentioned which are carried around with the driving housing 17. On an outwardly extending part of the lever 141 is shown a roller 142 arranged to cooperate with the thrust wall 70 of the coupling annulus 65. This arrangement gives a toggle effect, the roller being brought to the dead center position shown in Fig. 1 for thrusting outwardly on the coupling parts and thus uncoupling the intermediate speed drive. The toggle lever 141 has an outward extension 143 connected across by a link 144 with a similar toggle lever 145 at the front of the driving housing, this pivoted on pin 62 and carrying a roller 146 cooperating with the thrust plate 60 for the purpose of retracting the annulus 55 and relieving the high speed drive.

The described elements are shown in position with the high speed drive engaged and the intermediate speed drive disengaged. By throwing rearwardly the arm 135 and grooved collar 139 the adjustment will be reversed, the roller 142 passing from its dead center position to an inoperative position, thus applying the intermediate speed drive, and by the same movement the roller 146 passing into its dead center position and thrusting outwardly on the plate 60 to relieve the high speed drive. Enough play is allowed so that if the arm is held in mid position both drives will be disengaged.

By the described arrangement the coupling or frictional engaging action is maintained uniform, since the engagement of each coupling is effected by the springs 57 or 67, and the degree of pressure is not affected by wear. The use of the toggle lever connections facilitates the manual work of making the shift against the pressure of the springs, and a peculiar coaction is afforded by the fact that the work of overcoming and compressing each group of springs is assisted by the expansion of the other group of springs. Thus if the hand lever 115 is thrown forward to shift from high speed to intermediate speed drive the roller 146 will cam out the thrust plate 60 against the springs 57, whereas the roller 169, actuated by the springs 67 through the plate 70 will deliver pressure assisting the shift. A slight lost motion is arranged so that each roller does not engage its thrust plate until the other roller has swung to a substantial angle away from its dead center position.

Figure 9:
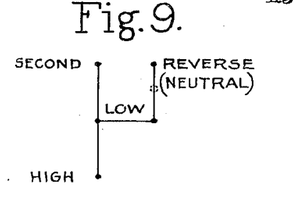
Fig. 9 is a top view diagram of the movements and adjustments of the control lever.

The manual control lever 115 therefore, when engaged with the shift arm 120, has only to be thrown forwardly from its middle or normal position to engage the intermediate speed drive, or rearwardly to engage the high speed drive, its middle position effectively disengaging both drives by reason of the rollers 146 and 169 holding both thrust plates 60 and 70 sufficiently outward to remove the coupling pressure between the friction disks or annuli. The shift mechanism so operating may be used in various combinations, but is herein illustrated as combined with a low speed drive operated through a one-way device, so that whenever the shift lever is brought to middle or normal position the low speed drive takes effect. Therefore the three positions of the control lever give the instant ability to change between low, intermediate and high speeds smoothly, with minimum effort, and without the operation of any separate clutch or equivalent. The adjustments are well shown in Figs. 8 and 9, from which it further appears that all drive can only be disconnected by swinging the control lever to the right and thence forward to neutral position, or in either of the separate modes already described.

Figures 5, 6:
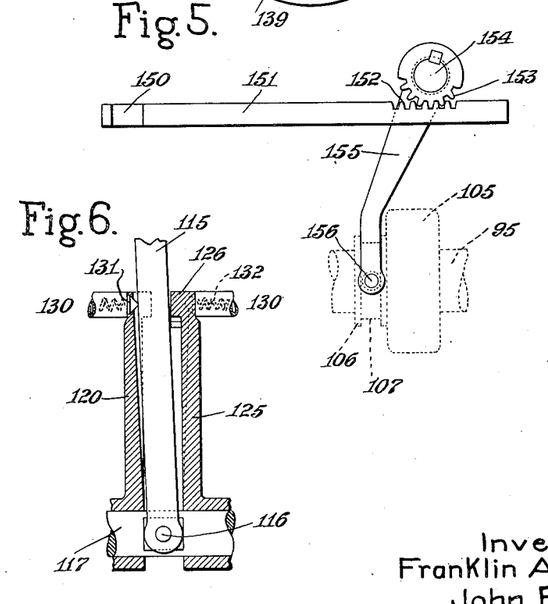
Fig. 5 is a top plan view of certain parts having to do with the shifting between low and reverse drives.
Fig. 6 is a transverse section view showing the manual control lever and adjacent parts, taken on the line 6—6 of Fig. 1.

The connections will next be described for controlling the low speed drive, either to shift it into a reverse adjustment or to neutral adjustment, or both. The shift arm 125, operable by the manual lever 115, has its hub turning loosely on the fulcrum shaft 117, and therebelow has an extension 149, the extremity of which engages in a notch 150 formed in the upper side of a bar 151 movable forwardly and rearwardly and shown as arranged to slide in a slideway formed in the fixed housing parts. The rear end of the slide bar 151 is shown in Figs. 3 and 5 as formed with rack teeth 152 engaging a pinion or teeth 153 provided at the top end of a shaft 154 extending downwardly and fulcrumed in fixed housing parts at its upper and lower ends. Near its lower end the upright shaft 154 carries a leftwardly extending arm 155 which is forked and the fork ends provided with studs or rollers 156 engaging in the groove 107 in the hub of the gear 105 which is slidable on the counter shaft 95.

By this arrangement when the shift arm 125 is in its normal position as shown, the pinion 105 engages with the gear 33 on the driven shaft as seen in Fig. 1, so that the slow drive connections are always in effect so long as the one-way device 101—103 is not overrun by the intermediate or high speed drives. When the manual control lever 115 is thrown to the right to engage the shift arm 125 the latter may be thrown full forwardly in a manner to throw full rearwardly the slide bar 151 thus shifting the gear 105 to the dotted line position seen in Fig. 1 wherein it engages with the reverse gears 110—111 to afford slow reverse drive. By bringing the control lever to a mid position the pinion 105 may be brought to a mid position wherein neither slow nor reverse will be engaged, thus in effect unclutching the slow drive; although it is preferable not to use this adjustment but to throw out all drive by a separate clutch or self regulating drive as already stated.

Figure 10:
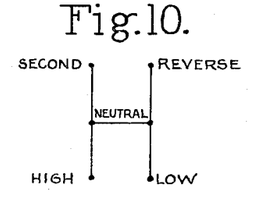
Fig. 10 a similar view of a modification.

The described arrangement of control lever, shift arms and locking pins may be variously rearranged. For example the cross-over of the lever, swung from one shift arm to the other, may be at the neutral adjustment of the slow and reverse gear 105, as indicated in Fig. 10, an arrangement similar in control movements to the modern gear-shift, and only needing to be symmetrically reversed and used with the usual clutch 11 to duplicate the shifting operation of the modern automobile, but affording the advantages of this invention, including the easy smooth gradual or frictional engagement of second and high speeds, and the ability to pass between low, second and high at will without use of the clutch but solely by the shift lever, the clutch being used only in initial starting and final stopping of drive.

The operation of the vehicle with the present invention has been generally indicated. If the embodiment shown in Figs. 1 to 9 is used in combination with a self adjusting transmission of the centrifugal mass type as disclosed in said prior patents, the control may be as follows. With the engine running at a negligibly slow speed the entire transmission is in effect unclutched, the centrifugal force of the masses being insufficient for their functioning. For this reason no separate clutch is necessary and the pinion 105 need never be shifted to neutral position, for which reason the drawings indicate no locking pin at that position. The vehicle may be started in motion with the control lever at any of its three positions, low, second or high, by merely opening up the engine throttle until the transmission becomes effective and the vehicle moves forwardly, after which the controller may be maintained in high speed position substantially continuously under the principles of the prior patents, driving at all usual speeds and ratios being performed by throttle only in cooperation with the self regulating action of the centrifugal mass transmission. To make an exceptionally quick start of the vehicle the controller may first be set to intermediate, or even to low speed, so as to deliver increased torque for the start, the lever being rapidly thrown forward to high. In driving it may occasionally be desirable to pass from high to second speed for the purpose of overcoming an unusual load or steep uphill. It will only be in emergencies that it will be necessary to employ the low speed, for example to give the maximum torque of the transmission, for the purpose of driving the vehicle out of a ditch, with wide open throttle. All of the described adjustments are effected solely by the single control lever 115 supplemented by the operation of the throttle, the speed and torque changing adjustments being effected smoothly, quietly and easily without the need of any action the equivalent of the opening and reclosing of the usual clutch. For reverse drive the engine should be slowed down to an inoperative speed and the controller employed to shift the adjustment to reverse followed by the opening of the throttle.

When the apparatus is provided with the usual clutch, for unclutching all drive, this will seldom require to be used, since, as before, all shifts between low speed, second speed and high speed may be readily effected by the manual lever 115 without any separate unclutching or clutching operation. The clutch then will only require to be employed for reengagement of the low speed connections after stoppage of the vehicle. All drive may be discontinued by simply shifting the control lever to neutral, which slides the pinion 105 to a mid position, giving neither low nor reverse, but in order to reengage the pinion in slow, or to engage at any time in reverse, the clutch may be opened during the shift and immediately reclutched, leaving the vehicle in slow or reverse. A similar result might be obtained without the shifting of the pinion to neutral by providing means to lock the usual clutch open at will so that the engine may run idly with the vehicle at rest. The clutching and unclutching may be effected by a friction clutch means at any point in the train of slow drive connections instead of at the usual point between the driving member 13 and the engine.

A combination including a one-way drive device in the slower of two drive connections is of utility whenever it may be desirable to pass from the higher to the lower speed by merely uncoupling the higher speed connections. For example with a motor vehicle the mere unclutching of the faster speed will allow the vehicle to slow to the slower speed, and the frictional applying of the faster speed will cause the vehicle to overrun the slower speed. The slow drive of course can not be used for retarding the vehicle, without an additional coupling, but that action is not essential for all of the various speeds of a vehicle.

It will thus be seen that there has been described a power transmission apparatus embodying the principles and attaining the advantages of the present invention. Since many matters of combination, operation, arrangement and structure may be variously modified without departing from the principles it is not intended to limit the invention to such matters except to the extent set forth in the appended claims.

What is claimed is:

1. Power transmission apparatus comprising in combination with the rotary driving and driven members or shafts; low speed transmitting connections comprising a driving gear turning with the driving member, a counter shaft, a first counter gear rotated by the driving gear and arranged for rotating the counter shaft, a second counter gear rotated by the counter shaft, and a driven gear turning with the driven member and rotated by the second counter gear, intermediate speed transmitting connections comprising an intermediate rotary member or sleeve concentric with the driven member, means for coupling the intermediate rotary member to the driving member, and reduction gearing between the intermediate and driven members consisting of an external gear on the intermediate rotary members, a unitary gear member mounted to rotate within an eccentric exterior bearing and having an internal gear meshing with said external gear and a smaller external gear, and on the driven member an internal gear meshing with said smaller external gear; high speed transmitting connections comprising means for coupling the driving and driven members; and a speed change control means shiftable to different positions and having connections for engaging either and disengaging either or both of the respective coupling means; the low speed connections being adapted to take effect when both the intermediate and high speed connections are uncoupled; whereby the drive may be shifted at will between low, intermediate and high without any separate unclutching or reclutching operation.

2. Power transmission apparatus comprising in combination with the rotary driving and driven members or shafts; low speed transmitting connections comprising a driving gear turning with the driving member, a counter shaft, a first counter gear rotated by the driving gear and arranged for rotating the counter shaft, a second counter gear rotated by the counter shaft, and a driven gear turning with the driven member and rotated by the second counter gear, said train of connections including a one-way drive device or pawl and ratchet adapted to permit rotation of the driven member by other means at faster speeds; intermediate speed transmitting connections comprising an intermediate rotary member or sleeve concentric with the driven member, means for coupling the intermediate rotary member to the driving member, and reduction gearing between the intermediate and driven members consisting of an external gear on the intermediate rotary member, a unitary gear member mounted to rotate within an eccentric exterior bearing and having an internal gear meshing with said external gear and a smaller external gear, and on the driven member an internal gear meshing with said smaller external gear; high speed transmitting connections comprising means for coupling the driving and driven members; and a speed change control means shiftable to different positions and having connections for engaging either and disengaging either or both of the respective coupling means, thereby affording the three drive speeds by the shifting thereof.

3. Power transmission apparatus comprising in combination with the rotary driving and driven members or shafts; low speed transmitting connections comprising a driving gear turning with the driving member, a counter shaft, a first counter gear rotated by the driving gear and arranged for rotating the counter shaft, a second counter gear rotated by the counter shaft, and a driven gear turning with the driven member and rotated by the second counter gear, said train of connections including a connecting device becoming automatically disengaged when other connections are engaged for rotation of the driven member at faster speeds; intermediate speed transmitting connections comprising an intermediate rotary member or sleeve concentric with the driven member, means for coupling the intermediate rotary member to the driving member, and reduction gearing between the intermediate and driven members consisting of an external gear on the intermediate rotary member, a unitary gear member mounted to rotate within an eccentric exterior bearing and having an internal gear meshing with said external gear and a smaller external gear, and on the driven member an internal gear meshing with said smaller external gear; high speed transmitting connections comprising means for coupling the driving and driven members; and a speed change control means shiftable to different positions and having connections for putting into effect at will any of said transmitting connections.

4. Power transmission apparatus comprising in combination with the rotary driving and driven members or shafts; reduced speed transmitting connections comprising an intermediate rotary member, means for frictionally coupling the intermediate rotary member to the driving member, and reduction gearing between the intermediate and driven members consisting of an external gear on the intermediate rotary member, a unitary gear member mounted to rotate within an eccentric exterior bearing and having an internal gear meshing with said external gear and a smaller external gear, and on the driven member an internal gear meshing with said smaller external gear; high speed transmitting connections comprising means for frictionally coupling the driving and driven members; and speed change control means having connections for engaging or disengaging either of the respective coupling means; one or both of said coupling means comprising complementary friction members or disks rotating respectively with the driving, intermediate or driven members, and means for frictionally engaging and disengaging them.

5. Power transmission apparatus comprising in combination with the rotary driving and driven members or shafts; reduced speed transmitting connections comprising an intermediate rotary member, means for frictionally coupling the intermediate rotary member to the driving member, and reduction gearing between the intermediate and driven members; high speed transmitting connections comprising means for frictionally coupling the driving and driven members; and speed change control means having connections for engaging or disengaging either of the respective coupling means; one or both of said coupling means comprising complementary friction members or disks rotating respectively with the driving, intermediate or driven members, and means for frictionally engaging and disengaging them, said engaging means comprising springs, and disengaging means comprising mechanical devices for overcoming the pressure of the springs, said mechanical devices being complementary in action for the high speed and reduced speed drives respectively whereby the spring for each drive assist overcoming the springs for the other drive.

6. Power transmission apparatus comprising in combination with the rotary driving and driven members or shafts; low speed transmitting connections comprising a driving gear turning with the driving member, a counter shaft, a first counter gear rotated by the driving gear and arranged for rotating the counter shaft, a second counter gear rotated by the counter shaft, and a driven gear turning with the driven member and rotated by the second counter gear, said train of connections including means automatically permitting rotation of the driven member at high speed, and one of said gears being shiftable to disengage another thereof and to engage an idler gear arranged to transmit reverse drive to the driven member; high speed transmitting connections comprising means for coupling the driving and driven members; and a speed change control means shiftable to different positions and having connections for putting the low, reverse or high speed drive into effect.

7. Power transmission apparatus comprising in combination with the rotary driving and driven members or shafts; reduced speed transmitting connections comprising an intermediate rotary member, means for coupling the intermediate rotary member to the driving member, and reduction gearing between the intermediate and driven members; high speed transmitting connections comprising means for coupling the driving and driven members; and speed change control means having connections for selectively engaging either of said respective coupling means; each of said coupling means comprising complementary clutch members, and means for engaging and disengaging them comprising a set of springs for each coupling means and mechanical devices for overcoming the pressure of the springs, said mechanical devices being so interconnected that the springs for each coupling are opposed to and assist overcoming the springs for the other coupling.

In testimony whereof, this specification has been duly signed by:

FRANKLIN A. REECE.
JOHN REECE.